United States Patent
Tadaoka

(10) Patent No.: US 10,573,343 B2
(45) Date of Patent: Feb. 25, 2020

(54) VIDEO IMAGE RECORDING CONTROL APPARATUS, VIDEO IMAGE RECORDING CONTROL METHOD, AND VIDEO IMAGE RECORDING CONTROL PROGRAM

(71) Applicant: JVC KENWOOD Corporation, Yokohama-shi, Kanagawa (JP)

(72) Inventor: Taketo Tadaoka, Yokohama (JP)

(73) Assignee: JVCKENWOOD Corporation, Yokohama-Shi, Kanagawa (JP)

( * ) Notice: Subject to any disclaimer, the term of this patent is extended or adjusted under 35 U.S.C. 154(b) by 0 days.

(21) Appl. No.: 16/374,041

(22) Filed: Apr. 3, 2019

(65) Prior Publication Data

US 2019/0228803 A1  Jul. 25, 2019

Related U.S. Application Data

(63) Continuation of application No. PCT/JP2017/043449, filed on Dec. 4, 2017.

(30) Foreign Application Priority Data

Jan. 27, 2017 (JP) ................. 2017-012937

(51) Int. Cl.
| | |
|---|---|
| *H04N 5/93* | (2006.01) |
| *G11B 19/04* | (2006.01) |
| *G11B 19/06* | (2006.01) |
| *G07C 5/00* | (2006.01) |
| *H04N 5/76* | (2006.01) |
| *G08B 21/00* | (2006.01) |
| *B60Q 1/00* | (2006.01) |

(Continued)

(52) U.S. Cl.
CPC .............. *G11B 19/041* (2013.01); *B60Q 1/00* (2013.01); *G06F 12/16* (2013.01); *G07C 5/00* (2013.01); *G08B 21/00* (2013.01); *G11B 19/06* (2013.01); *H04N 5/76* (2013.01); *H04N 5/907* (2013.01); *H04N 5/77* (2013.01); *H04N 7/18* (2013.01)

(58) Field of Classification Search
CPC ........... G06F 12/16; G07C 5/00; G08B 21/00; G08G 1/00; G11B 19/041; G11B 19/06; H04N 5/76; H04N 5/77; H04N 5/907; H04N 5/91
USPC ........ 386/278, 248, 291, 292, 294, 295, 326
See application file for complete search history.

(56) References Cited

FOREIGN PATENT DOCUMENTS

| | | | |
|---|---|---|---|
| JP | 2008-9755 A | | 1/2008 |
| JP | 02009289204 A | * | 12/2009 |

(Continued)

*Primary Examiner* — Robert Chevalier
(74) *Attorney, Agent, or Firm* — Procopio, Cory, Hargreaves & Savitch LLP

(57) ABSTRACT

The present disclosure aims to appropriately control a recording mode when the end of a rewrite life of a recording apparatus has approached. A video image recording control apparatus according to the present disclosure includes: a recording processing unit configured to record video image data in a recording apparatus by a first recording mode in which video image data captured by an image pickup apparatus is recorded and a second recording mode in which video image data captured when an abnormality has been detected is recorded separately from the first recording mode; and a recording controller configured to restrict the first recording mode for the recording processing unit when the number of times of data rewriting for the recording apparatus has exceeded a first threshold.

5 Claims, 8 Drawing Sheets

(51) Int. Cl.
  *G06F 12/16*   (2006.01)
  *H04N 5/907*   (2006.01)
  *H04N 9/80*   (2006.01)
  *H04N 7/18*   (2006.01)
  *H04N 5/77*   (2006.01)

(56) References Cited

FOREIGN PATENT DOCUMENTS

| | | |
|---|---|---|
| JP | 2012-53506 A | 3/2012 |
| JP | 2013-156746 A | 8/2013 |
| JP | 2015-219746 A | 12/2015 |
| KR | 20040012642 A * | 2/2004 |

\* cited by examiner

VIDEO IMAGE RECORDING CONTROL APPARATUS, VIDEO IMAGE RECORDING CONTROL METHOD, AND VIDEO IMAGE RECORDING CONTROL PROGRAM

CROSS REFERENCE TO RELATED APPLICATION

This application is based upon and claims the benefit of priority from Japanese patent application No. 2017-012937 filed on Jan. 27, 2017, and is a Continuation of International application No. PCT/JP2017/043449 filed on Dec. 4, 2017, the disclosures of which are incorporated herein in its entirety by reference.

BACKGROUND

The present disclosure relates to a video image recording control apparatus, a video image recording control method, and a video image recording control program.

A drive recorder that is mounted on a vehicle and mainly records video images in front of the vehicle records video images in two modes, that is, a loop recording mode and an event recording mode. The loop recording mode is a mode for constantly recording video images captured during the driving. The event recording mode is a mode for recording video images captured when an abnormality such as an accident or sudden braking has been detected. Since the event recording is important as information on an accident or an incident, the video images are recorded as overwrite-prohibited data separately from the loop recording. An SD card is often used as a storage element for such recording.

Japanese Unexamined Patent Application Publication No. 2012-53506 discloses a drive recorder in which a warning is given to a user by an operation lamp 28 and a buzzer 29 when the number of rewrites in a memory card 9 has reached the upper limit and the user is notified that the number of rewrites in the memory card 9 has reached the upper limit. Further, an image processing apparatus disclosed in Japanese Unexamined Patent Application Publication No. 2015-219746 prohibits rewriting when it is determined that a NAND memory has reached the end of its life.

SUMMARY

However, the technique disclosed in Japanese Unexamined Patent Application Publication No. 2012-53506 is only alarm means, and the SD card ends up being used even after the number of rewrites in the SD card exceeds the rewrite restricted number unless the user replaces the SD card by another one in accordance with the alarm information. When the SD card continues to be used even after the number of rewrites in the SD card exceeds the rewrite restricted number in the SD card, a problem such that an important scene such as an event has not been recorded may occur. On the other hand, when writing is prohibited, that is, recording itself is prohibited when the memory has reached the end of its life like in Japanese Unexamined Patent Application Publication No. 2015-219746, the event recording cannot be performed and the drive recorder function cannot be achieved.

A first aspect of this embodiment provides a video image recording control apparatus including: a recording processing unit configured to record video image data in a recording apparatus by a first recording mode in which video image data captured by an image pickup apparatus is recorded and a second recording mode in which video image data captured when an abnormality has been detected is recorded separately from the first recording mode; and a recording controller configured to restrict the first recording mode for the recording processing unit when the number of times of data rewriting for the recording apparatus has exceeded a first threshold which is smaller than a restriction value of the number of times of data rewriting of the recording apparatus.

A second aspect of this embodiment provides a video image recording control method in a video image recording control apparatus including: a recording processing unit configured to record video image data in a recording apparatus by a first recording mode in which video image data captured by an image pickup apparatus is recorded and a second recording mode in which video image data captured when an abnormality has been detected is recorded separately from the first recording mode; and a recording controller configured to perform control on the recording processing unit, the method including the steps of: determining whether the number of times of data rewriting for the recording apparatus has exceeded a first threshold; and restricting the first recording mode for the recording processing unit when it is determined that the number of times of data rewriting for the recording apparatus has exceeded the first threshold which is smaller than a restriction value of the number of times of data rewriting of the recording apparatus.

A third aspect of this embodiment provides a non-transitory computer readable medium storing a video image recording control program for causing a computer including: a recording processing unit configured to record video image data in a recording apparatus by a first recording mode in which video image data captured by an image pickup apparatus is recorded and a second recording mode in which video image data captured when an abnormality has been detected is recorded separately from the first recording mode; and a recording controller configured to perform control on the recording processing unit, to execute the following steps of: determining whether the number of times of data rewriting for the recording apparatus has exceeded a first threshold; and restricting the first recording mode for the recording processing unit when it is determined that the number of times of data rewriting for the recording apparatus has exceeded the first threshold which is smaller than a restriction value of the number of times of data rewriting of the recording apparatus.

DETAILED DESCRIPTION

In the following description, with reference to the drawings, specific embodiments when the present disclosure is mounted on a vehicle will be explained in detail. Throughout the drawings, the same elements are denoted by the same reference symbols and overlapping descriptions will be omitted as necessary for the sake of clarification of the description.

First Embodiment

Figure 1:
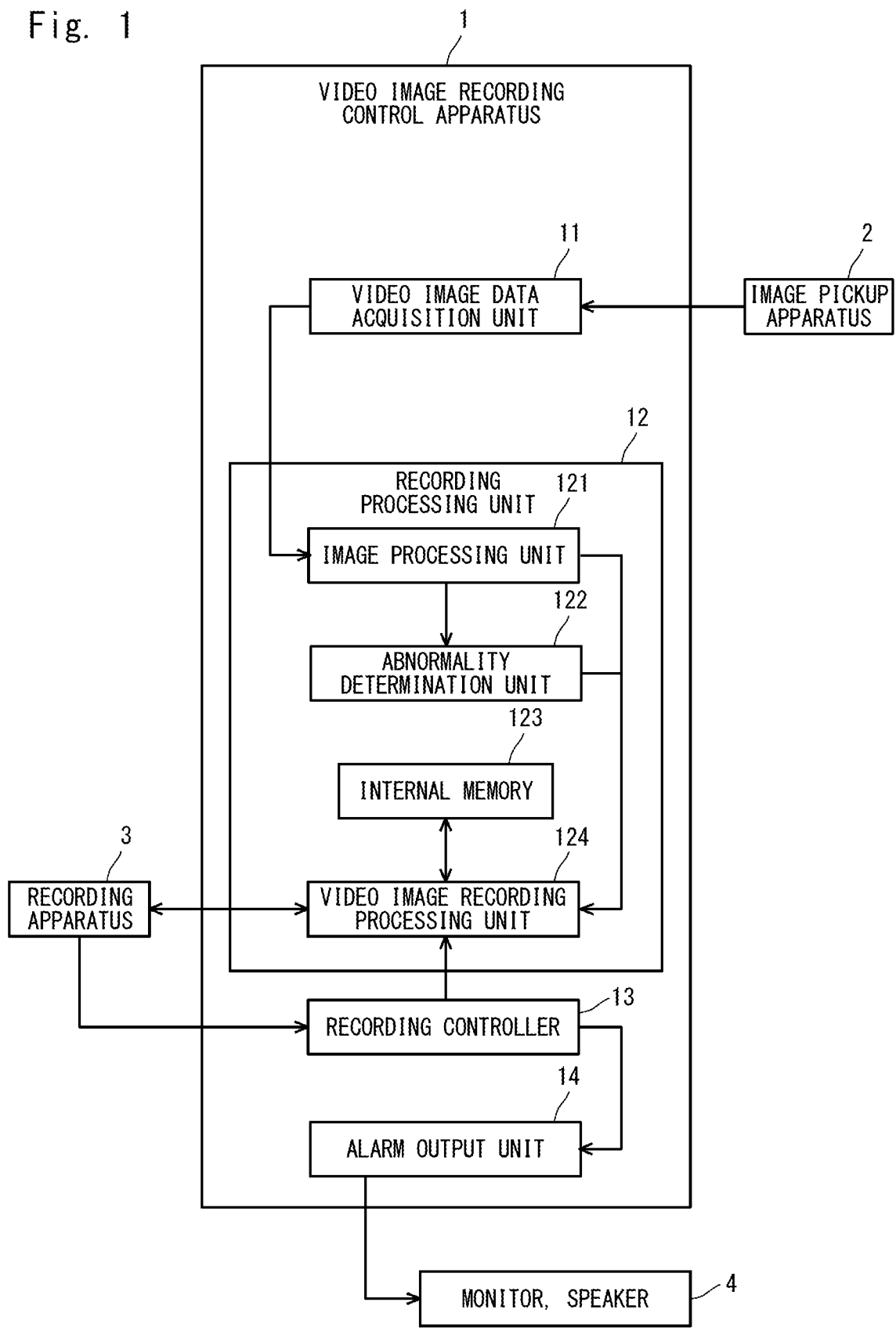
FIG. 1 is a block diagram showing a configuration of a video image recording control apparatus according to a first embodiment.

FIG. 1 is a block diagram showing a configuration of a video image recording control apparatus 1 according to a first embodiment. The video image recording control apparatus 1 is connected to an image pickup apparatus 2, a recording apparatus 3, and a monitor and a speaker 4. The video image recording control apparatus 1 is, for example, a drive recorder mounted on a moving body such as a vehicle.

However, the video image recording control apparatus 1 according to this embodiment is not limited to an in-vehicle drive recorder. The image pickup apparatus 2 is, for example, an in-vehicle camera or the like that captures images in front of the vehicle and outputs video image data. The recording apparatus 3, which is an external storage device, is, for example, an SD card, a USB memory, a hard disk, or a semiconductor memory. The recording apparatus 3 may be embedded in the video image recording control apparatus 1. It is further assumed that the recording apparatus 3 updates the number of times of data rewriting held therein every time the data is rewritten. The monitor and the speaker 4 are examples of alarm means for outputting alarm information to a driver or the like of the vehicle by means of voice, buzzer, screen display or the like.

The video image recording control apparatus 1 includes a video image data acquisition unit 11, a recording processing unit 12, a recording controller 13, and an alarm output unit 14. The video image data acquisition unit 11 takes in a RAW image (Raw image format) output from the image pickup apparatus 2 as video image data, and outputs the image that has been taken to the recording processing unit 12.

The recording processing unit 12 records the video image data in an internal memory 123 or the recording apparatus 3 in such a way that the video image data is distinguished a write destination device, a write area on this device, an overwrite restriction flag, each mode flag or the like according to a plurality of recording modes. The recording modes include, for example, a first recording mode in which the video image data captured by the image pickup apparatus 2 is recorded while it is overwritten, a second recording mode in which video image data captured when an abnormality such as an accident or a sudden brake has been detected is recorded in a rewrite prohibited mode, and a third recording mode in which the user manually starts recording. One example of the first recording mode is, for example, a loop recording mode in which video images are automatically recorded during the driving of the vehicle, one example of the second recording mode is an event recording mode, and one example of the third recording mode is a manual recording mode. Further, the manual recording mode may be referred to as the first recording mode and the event recording mode may be referred to as the second recording mode. Further, the event recording mode may be divided into a plurality of modes in accordance with the degree of the abnormality, and one of the modes may be referred to as the first recording mode and another one of them may be referred to as the second recording mode.

The recording processing unit 12 includes an image processing unit 121, an abnormality determination unit 122, the internal memory 123, and a video image recording processing unit 124. The image processing unit 121 performs image processing such as Auto Gain Control (AGC) or white balance adjustment on the image taken by the video image data acquisition unit 11, and performs processing such as Moving Picture Experts Group (MPEG) encoding, which is a recording format. The abnormality determination unit 122 performs processing such as motion detection, motion vector detection, or proximity object detection from the image data output from the image processing unit 121, detects proximity to an obstacle such as another vehicle, a pedestrian, or a utility pole, and determines, when there is a possibility that a contact or an accident may occur, that an abnormality has occurred. The abnormality determination unit 122 may determine an abnormality by detecting abnormal brightness of an image or the like and it does not depend on the processing means as long as it can detect an abnormality that can be determined from the image. The image data may be data before MPEG encoding. The video image recording processing unit 124 performs processing for recording the image data output from the image processing unit 121 in the internal memory 123 or the recording apparatus 3. The video image recording processing unit 124 performs recording in accordance with the recording mode and the flag for restricting specific recording described above. When, for example, a loop recording prohibition flag is in the ON state, the video image recording processing unit 124 does not perform loop recording. When a loop recording suppression flag is in the ON state, recording in which the bit rate, the resolution, the frame rate, or the data compression rate of the video images is, for example, controlled, and thus the amount of data to be recorded is reduced is performed. In the following processing, the loop recording prohibition flag and the loop recording suppression flag are collectively referred to as a loop recording restriction flag.

The recording controller 13 acquires the number of times of data rewriting from the recording apparatus 3, and outputs the flag for restricting specific recording when the end of the life of the recording apparatus 3 is approaching. That is, the recording controller 13 performs control for the recording processing unit 12 so as to prohibit the first recording mode or prevent data recording when the number of times of data rewriting for the recording apparatus 3 exceeds a first threshold α. Specifically, the recording controller 13 sets the loop recording restriction flag to the ON state and outputs this flag to the video image recording processing unit 124. It is assumed that the first threshold α is smaller than the restriction value of the number of times of data rewriting of the recording apparatus 3. Along with this operation, when the number of times of data rewriting for the recording apparatus 3 exceeds the first threshold α, the recording controller 13 instructs the alarm output unit 14 to output alarm information. For example, the recording controller 13 may set the loop recording restriction flag to the ON state and output this flag to the alarm output unit 14 as well.

The alarm output unit 14 outputs alarm information to an external device when the number of times of data rewriting for the recording apparatus 3 has exceeded the first threshold α. The alarm output unit 14 outputs, for example, alarm information for urging replacement of the recording apparatus 3 or alarm information indicating that the recording has been restricted to the monitor and the speaker 4 in accordance with an instruction from the recording controller 13. The alarm output unit 14 may output predetermined alarm information when the loop recording restriction flag is in the ON state. Further, the alarm output may be any one of sound, screen display and the like.

Incidentally, the video image recording control apparatus 1 can be achieved by a versatile computer apparatus. In this case, the video image recording control apparatus 1 includes a controller such as a Central Processing Unit (CPU) as a structure that is not shown. Further, a built-in storage unit, which is a component that is not shown, stores a video image recording control program or the like, which is a computer program in which the processing according to this embodiment is implemented, as a component that is not shown. Then the controller reads the video image recording control program or the like stored in the storage unit and executes this program. Accordingly, the video image recording control apparatus 1 operates as the video image data acquisition unit 11, the recording processing unit 12, the recording controller 13, the alarm output unit 14 and the like.

Figure 2:
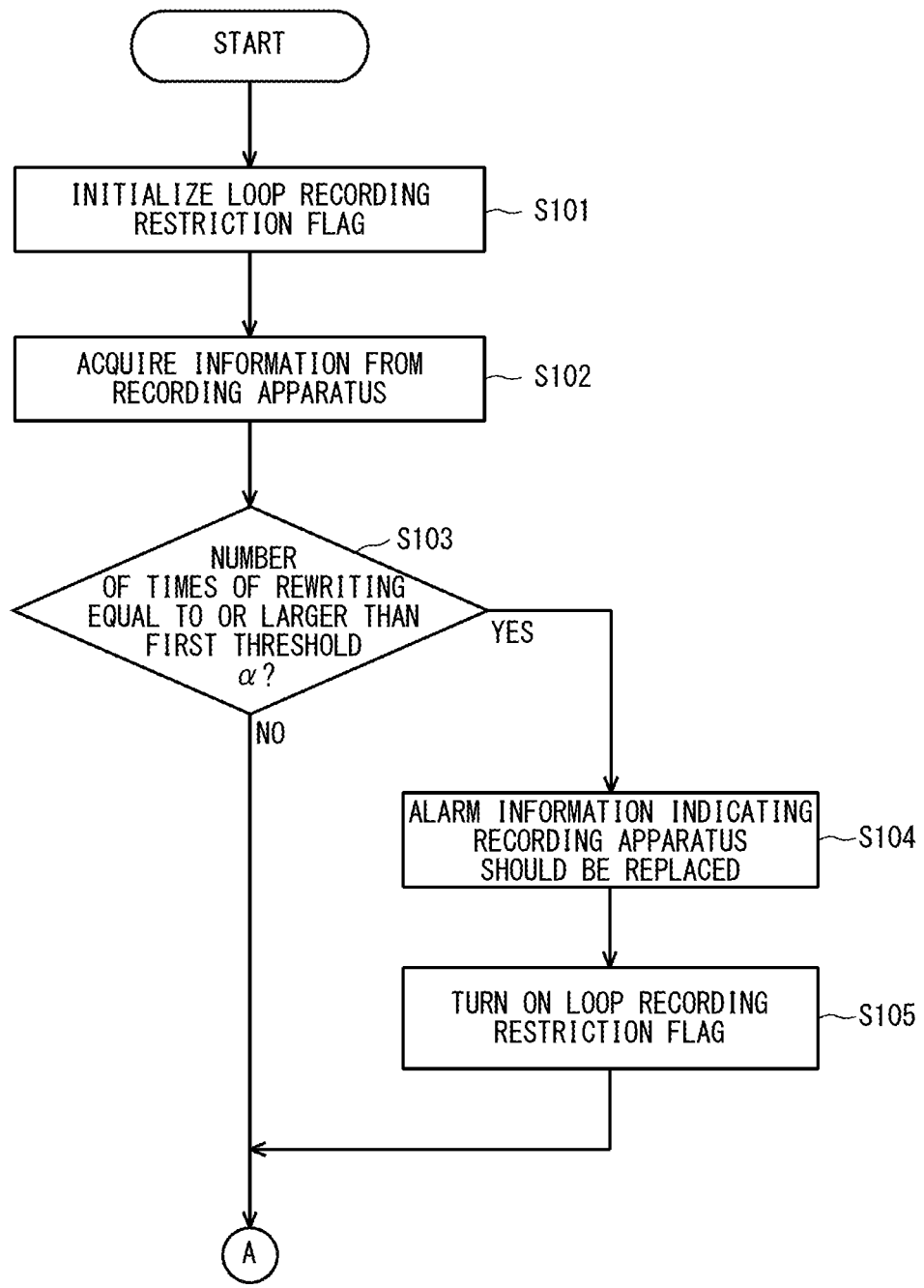
FIG. 2 is a flowchart for describing a flow of a video image recording control method according to the first embodiment.
Figure 3:
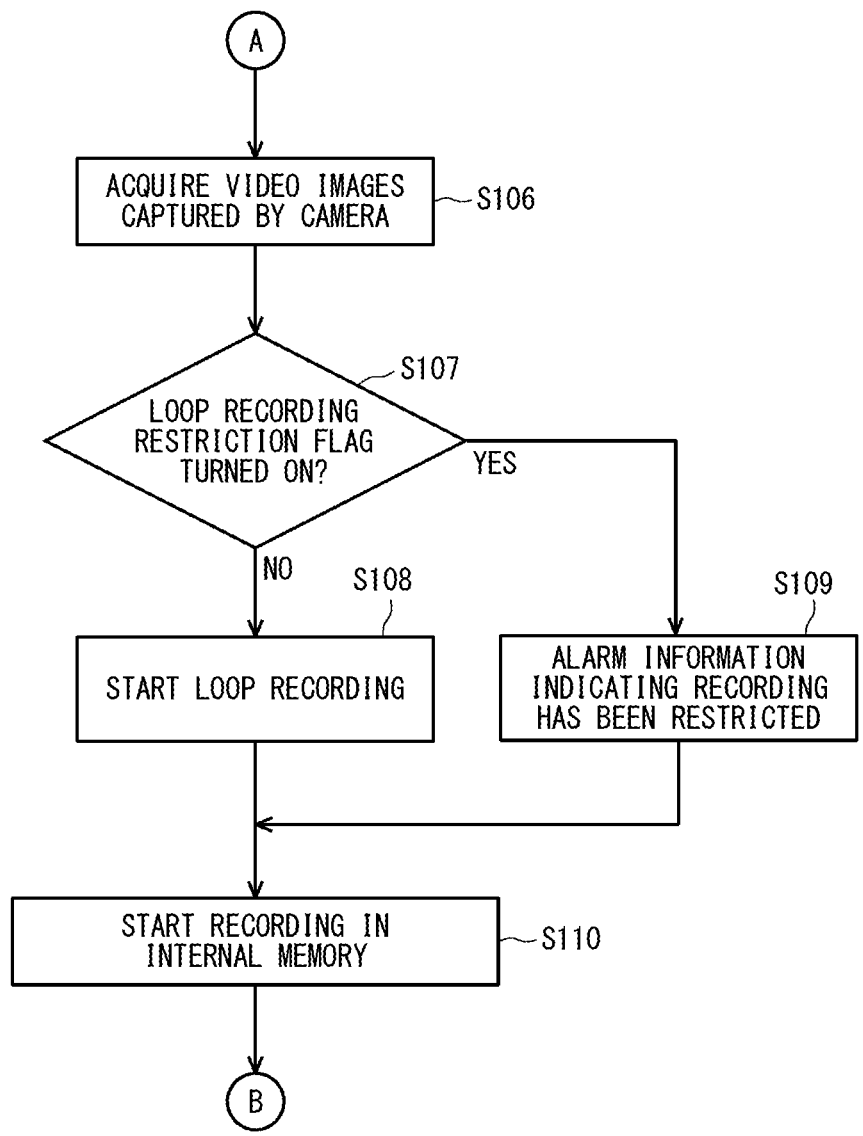
FIG. 3 is a flowchart for describing a flow of the video image recording control method according to the first embodiment.
Figure 4:
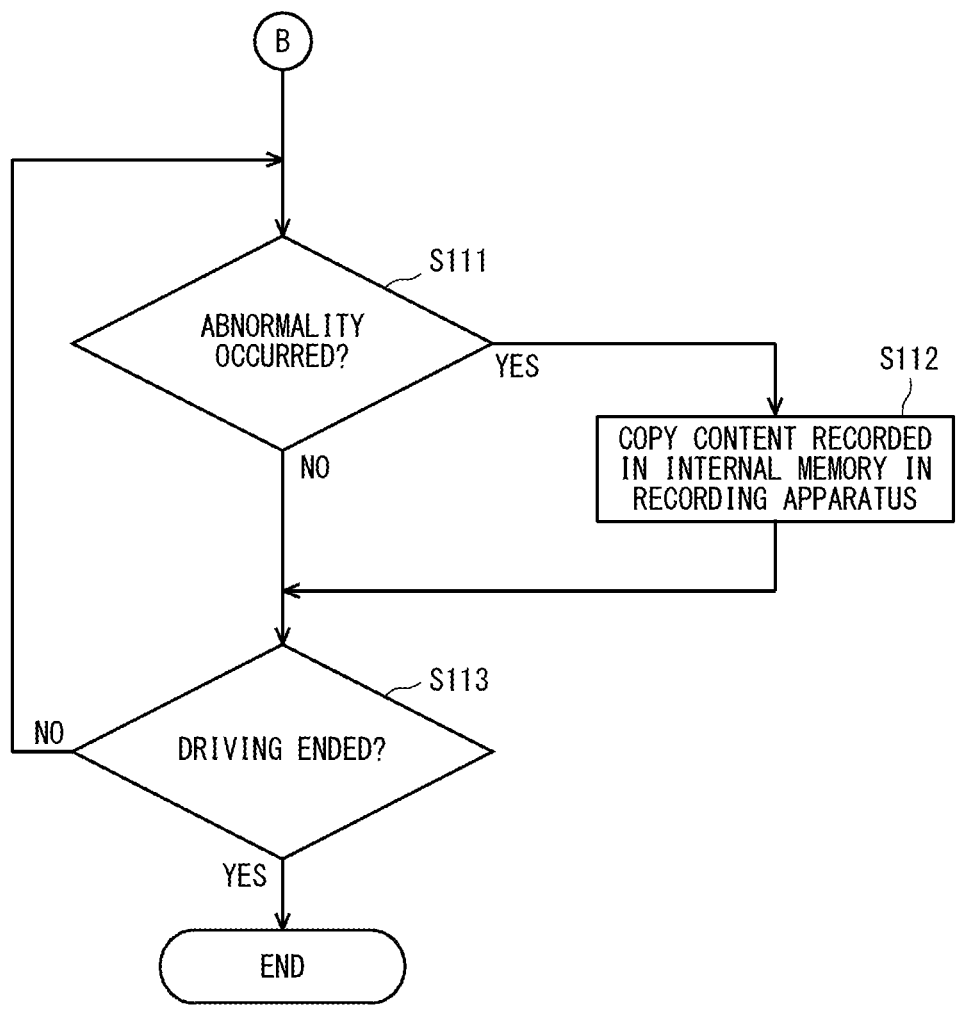
FIG. 4 is a flowchart for describing the flow of the video image recording control method according to the first embodiment.

FIGS. 2, 3, and 4 are flowcharts for describing a flow of a video image recording control method according to the first embodiment. First, the video image recording control apparatus 1 initializes the loop recording restriction flag (S101). Specifically, the recording controller 13 of the video image recording control apparatus 1 turns off the loop image recording restriction flag. Next, the recording controller 13 acquires information on the number of times of data rewriting from the recording apparatus 3 (S102).

Next, the recording controller 13 determines whether the number of times of data rewriting is equal to or larger than the first threshold α (S103). When the number of times of data rewriting is smaller than the first threshold α, the process goes to Step S106. When the number of times of data rewriting is equal to or larger than the first threshold α, the recording controller 13 instructs the alarm output unit 14 to output alarm information. Then the alarm output unit 14 causes the monitor and the speaker 4 to output alarm information indicating that the recording apparatus 3 should be replaced by another one in accordance with an instruction (S104). Further, the recording controller 13 turns on the loop recording restriction flag (S105). The order of Steps S104 and S105 may be switched or these steps may be performed at the same time.

After that, the video image data acquisition unit 11 acquires the video image data captured by the camera, which is one example of the image pickup apparatus 2 (S106). Then, the video image recording processing unit 124 of the recording processing unit 12 determines whether the loop recording restriction flag has been turned on (S107). When the loop recording restriction flag is in the ON state, the alarm output unit 14 causes the monitor and the speaker 4 to output information indicating that the recording is being restricted (S109). On the other hand, when the loop recording restriction flag is in the OFF state, the video image recording processing unit 124 starts loop recording of the video image data for the recording apparatus 3 (S108). Then the video image recording processing unit 124 starts the recording in the internal memory 123 (S110). The video image recording processing unit 124 may also record detailed information indicating the state or the like of the vehicle in the internal memory 123. The video image recording processing unit 124 performs loop recording also for the internal memory 123. Therefore, when a certain period of time passes, the content recorded in the recording apparatus 3 and the internal memory 123 is overwritten by new recording information.

After that, the abnormality determination unit 122 determines whether an abnormality has occurred (S111). When it is determined that an abnormality has occurred, the video image recording processing unit 124 copies the content recorded in the internal memory 123 in the recording apparatus 3 (S112). Specifically, the video image recording processing unit 124 records the recording information recorded in the internal memory 123 in the recording apparatus 3 as the event recording mode separately from the loop recording. Further, the internal memory 123 may not be provided, and the video image data may be directly recorded in the recording apparatus 3.

Then the video image recording control apparatus 1 determines whether the driving has been ended (S113). During the driving, that is, when the vehicle is still driving, the process goes back to Step S111. On the other hand, when the driving has been ended, this processing is ended.

In the drive recorder, the loop recording is normally performed, and video images continue to be recorded during the driving. Therefore, the number of overwriting times, that is, the number of times of data rewriting, in the SD card, which is one example of the recording apparatus 3 becomes inevitably large, and the period until the life of the SD card becomes shorter as compared to use in other applications. Therefore, the user often does not recognize that the SD card has reached the end of its life.

In this embodiment, it is detected that the end of the life of the SD card or the like is approaching, a warning is given to the user by means of voice, screen display, buzzer or the like, and the loop recording mode is restricted. The loop recording is relatively less important than the event recording, and the amount of data written into the SD card and the number of rewriting times are large. Therefore, by restricting the loop recording mode, the rewriting itself is prevented and only the event recording, which is more important than the loop recording, is permitted. It is therefore possible to prolong the life of the SD card while maintaining the function of the drive recorder during a period from the timing when the warning is given to the timing when the SD card is replaced by another one. That the end of the life of the SD card or the like is approaching may be detected by the determination based on the number of rewriting times or by known art such as the life information calculation method disclosed in Japanese Unexamined Patent Application Publication No. 2008-9755. Therefore, detailed descriptions thereof will be omitted.

Second Embodiment

A second embodiment is a modified example of the aforementioned first embodiment. That is, in the second embodiment, recording at the time of abnormality, which is recording performed when sensors have detected an abnormal behavior of the vehicle, is recorded as event recording.

Figure 5:
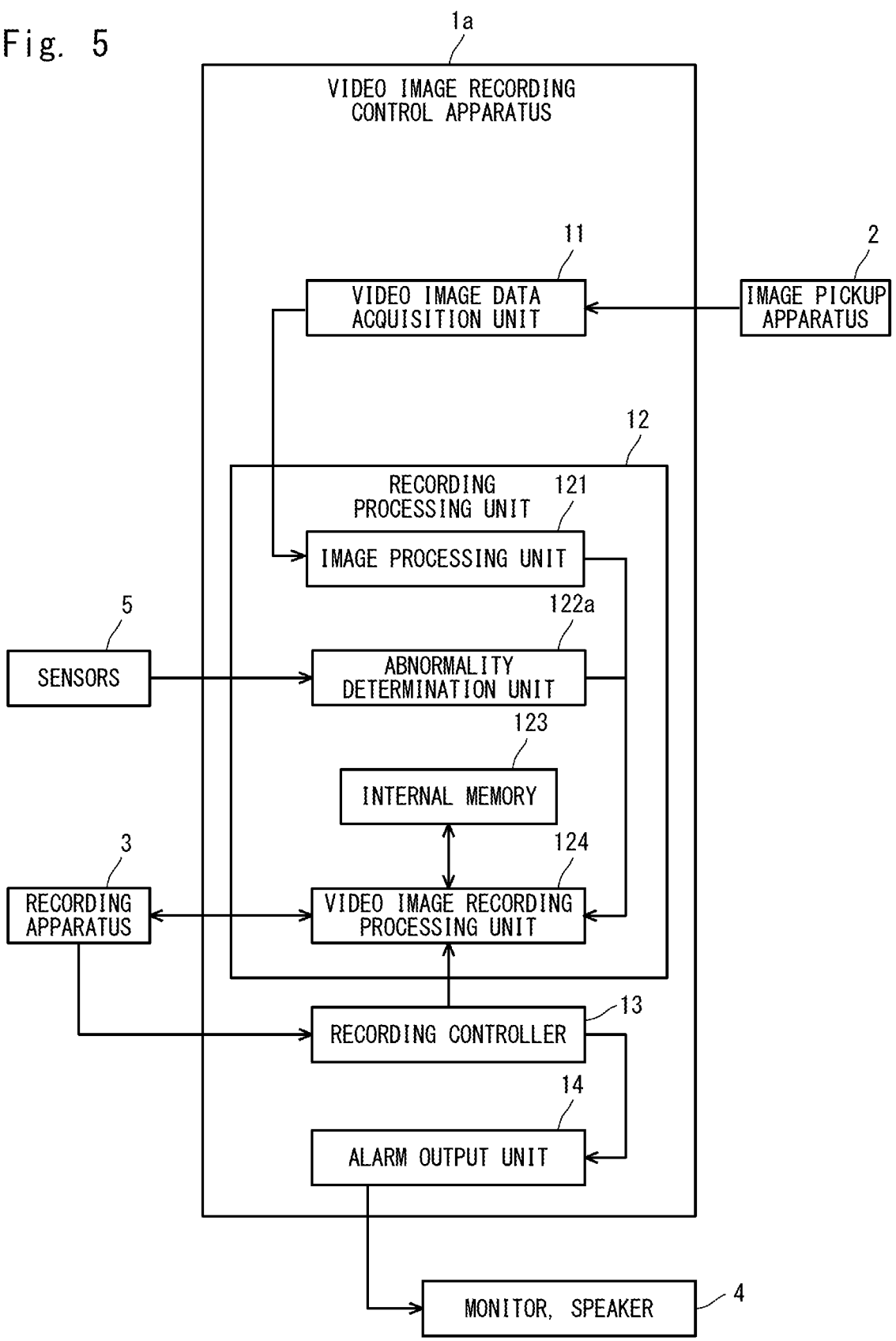
FIG. 5 is a block diagram showing a configuration of a video image recording control apparatus according to a second embodiment.

FIG. 5 is a block diagram showing a configuration of a video image recording control apparatus 1a according to the second embodiment. The video image recording control apparatus 1a is different from the video image recording control apparatus 1 in that sensors 5 are further connected thereto. The sensors 5 detect abnormal behavior of the vehicle and is, for example, an acceleration sensor or a radar. The sensors 5 detect, for example, a contact, an impact or the like of an obstacle. Alternatively, the sensors 5 may detect an abnormal sound by a sound-collecting microphone. Further, the sensors 5 may acquire vehicle information such as a vehicle speed or a steering wheel angle and use the acquired information for the detection and do not depend on the type of the sensors and the processing means as long as it is possible to detect an abnormality of the vehicle behavior such as angular velocity, illuminance, or temperature. Then an abnormality determination unit 122a determines that an abnormality has occurred in accordance with the results of the detection in the sensors 5, and notifies the video image recording processing unit 124 that the abnormality has been detected. The abnormality determination unit 122a may be installed separately from the video image recording control apparatus 1a in such a way that it is connected to the video image recording control apparatus 1a, and may input the result of the determination of the abnormality by the abnormality determination unit 122a to the video image recording control apparatus 1a.

Third Embodiment

A third embodiment is a modified example of the aforementioned first or second embodiment. That is, a recording processing unit according to the third embodiment records video image data captured in accordance with a manual operation by a user in the recording apparatus by the first recording mode, the second recording mode, or a third recording mode in which the video image data is recorded separately from the first recording mode and the second recording mode. Then the recording controller according to the third embodiment restricts recording in a manual recording mode, which is the third recording mode, when the number of times of data rewriting has exceeded a second threshold β, which is different from the first threshold α.

The second threshold β of the number of times of data rewriting is set to be, for example, larger than the first threshold α. When the number of times of data rewriting does not exceed the first threshold α, the writing of the video image data in the SD card or the like is not restricted. However, when the number of times of data rewriting exceeds the first threshold α but does not exceed the second threshold β, only the loop recording in which data is automatically recorded during the driving of the vehicle is restricted. When the number of times of data rewriting exceeds the second threshold β, both the loop recording, and the manual recording, which is the recording performed manually by the user, are restricted. Further, a third threshold may be set, and writing may be restricted when it is determined that the degree of the abnormality is low even in the event recording, which is the recording mode when an abnormality of the vehicle has been detected. The manual recording may be restricted when the number of times of data rewriting has exceeded the first threshold. The setting of the threshold and the setting of the recording mode to be restricted are not limited to those stated above, and the second threshold β of the number of times of data rewriting may be the same as the first threshold α. Further, when the manual recording is restricted, a warning is preferably given by voice or the like when the user tries to perform recording. Further, there may be a control change such as temporarily canceling the writing restriction by some operation such as an operation in which a recording button is kept to be pressed. The recording time in the manual recording may be restricted to be short. It is therefore possible to perform fine recording and alarm control.

Figure 6:
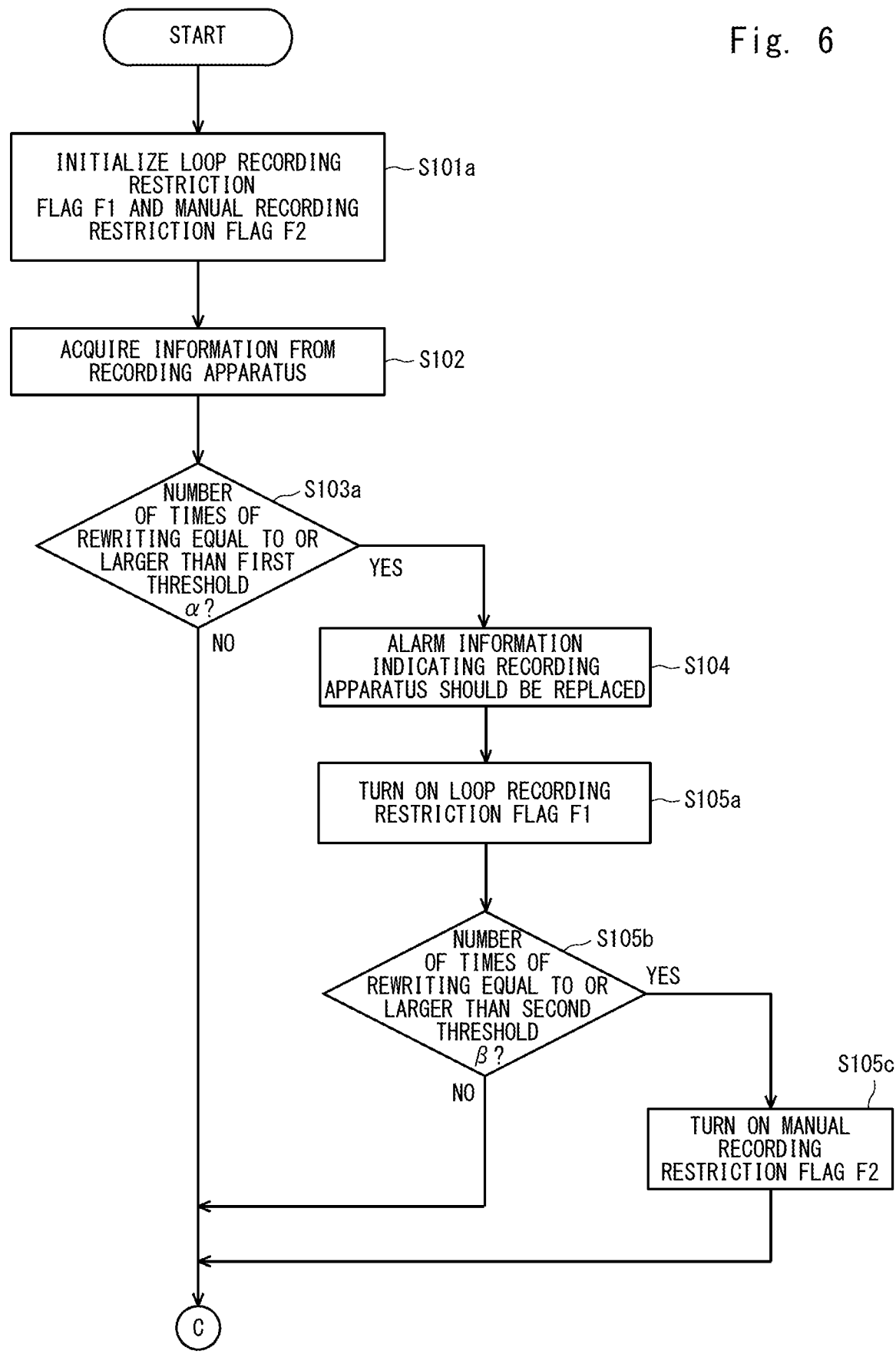
FIG. 6 is a flowchart for describing a flow of a video image recording control method according to a third embodiment of the present disclosure.
Figure 7:
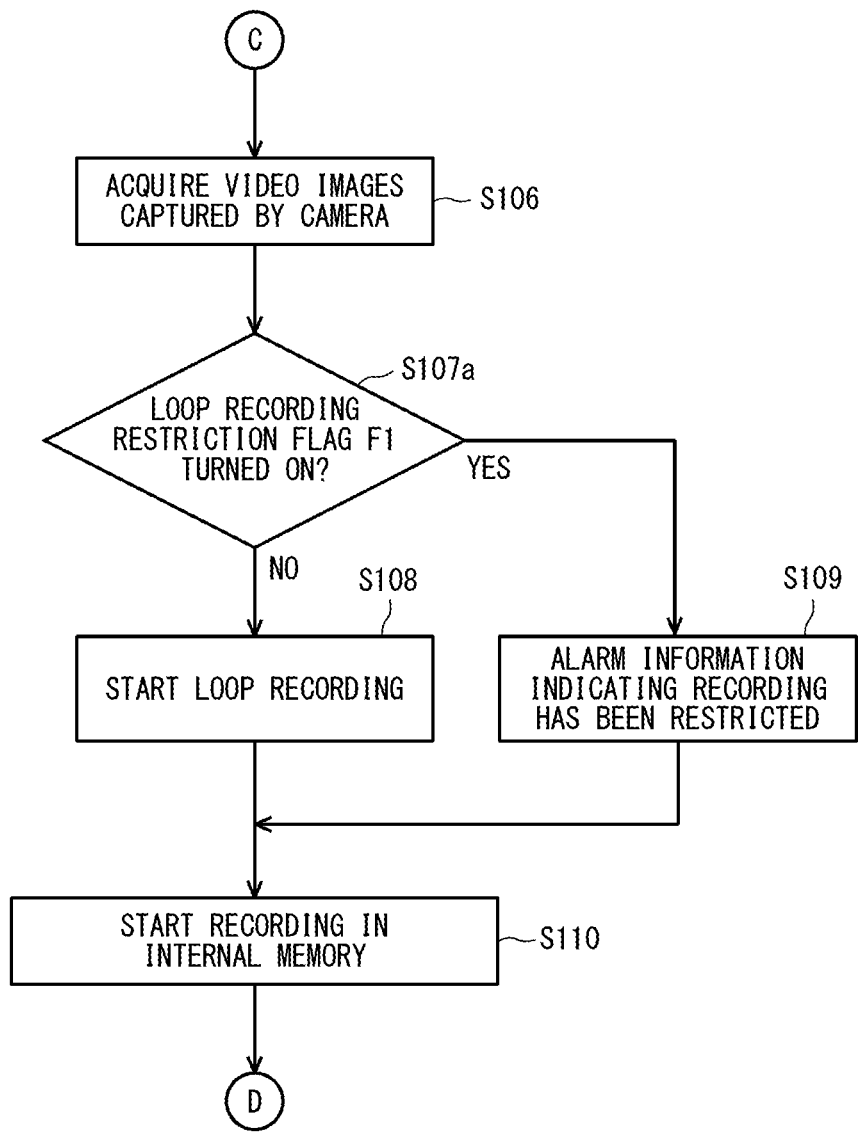
FIG. 7 is a flowchart for describing a flow of the video image recording control method according to the third embodiment.
Figure 8:
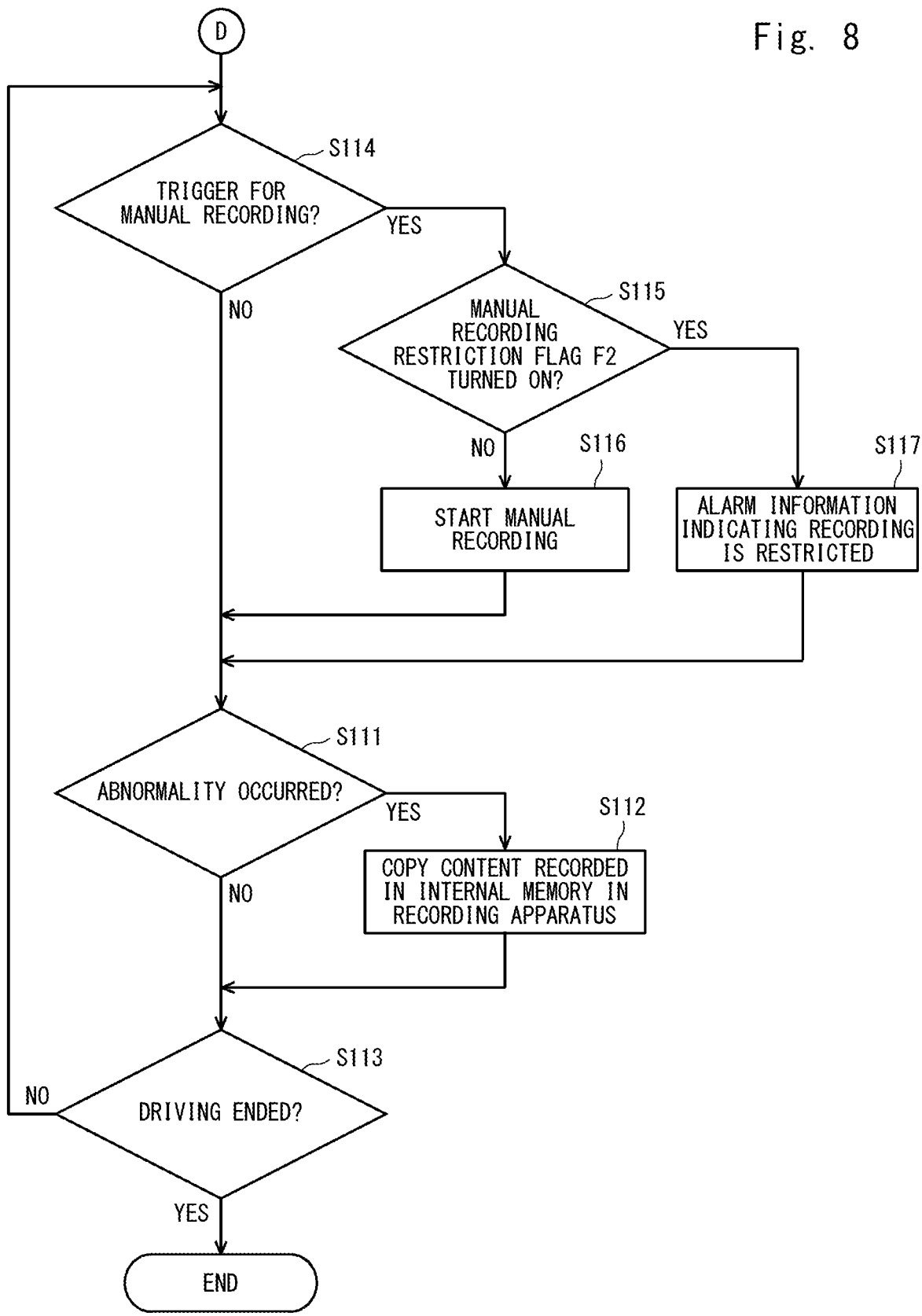
FIG. 8 is a flowchart for describing a flow of the video image recording control method according to the third embodiment.

FIGS. 6, 7, and 8 are flowcharts for describing a flow of the video image recording control method according to the third embodiment. First, the video image recording control apparatus 1 initializes a loop recording restriction flag F1 and a manual recording restriction flag F2 (S101a). Next, the recording controller 13 acquires information on the number of times of data rewriting from the recording apparatus 3 (S102).

Next, the recording controller 13 determines whether the number of times of data rewriting is equal to or larger than the first threshold α (S103a). When the number of times of data rewriting is smaller than the first threshold α, the process goes to Step S106. Further, when the number of times of data rewriting is equal to or larger than the first threshold α, the recording controller 13 instructs the alarm output unit 14 to output alarm information. Then the alarm output unit 14 causes the monitor and the speaker 4 to output alarm information indicating that the recording apparatus 3 should be replaced by another one in accordance with an instruction (S104). Further, the recording controller 13 turns on the loop recording restriction flag F1 (S105a). The order of Step S104 and Step S105a may be switched or these steps may be performed at the same time.

The recording controller 13 determines whether the number of times of data rewriting is equal to or larger than the second threshold β (S105b). When the number of times of data rewriting is smaller than the second threshold β, the process goes to Step S106. On the other hand, when the number of times of data rewriting is equal to or larger than the second threshold β, the recording controller 13 turns on the manual recording restriction flag F2 (S105c).

After that, the video image data acquisition unit 11 acquires the video image data captured by the camera (S106). Then the video image recording processing unit 124 of the recording processing unit 12 determines whether the loop recording restriction flag F1 is in the ON state (S107a). When the loop recording restriction flag F1 is in the ON state, the alarm output unit 14 causes the monitor and the speaker 4 to output information indicating that recording is restricted (S109). On the other hand, when the loop recording restriction flag F1 is in the OFF state, the video image recording processing unit 124 starts loop recording of the video image data for the recording apparatus 3 (S108). Then the video image recording processing unit 124 starts recording in the internal memory 123 (S110).

After that, the video image recording control apparatus 1 determines whether a trigger for the manual recording has been detected (S114). The video image recording control apparatus 1 detects, for example, whether the user has turned on a manual recording switch (not shown) of the video image recording control apparatus 1. When a trigger for the manual recording has not been detected, the process goes to Step S111. On the other hand, when a trigger for the manual recording has been detected, the video image recording processing unit 124 determines whether the manual recording restriction flag F2 is in the ON state (S115). When the manual recording restriction flag F2 is in the OFF state, the video image recording processing unit 124 starts manual recording of the video image data for the recording apparatus 3 (S116). That is, the video image recording processing unit 124 records the video image data for the recording apparatus 3. On the other hand, when the manual recording restriction flag F2 is in the ON state, the alarm output unit 14 causes the monitor and the speaker 4 to output information indicating that recording by the manual recording is being restricted (S117).

After that, the abnormality determination unit 122 determines whether an abnormality has occurred (S111). When it is determined that an abnormality has occurred, the video image recording processing unit 124 copies the content recorded in the internal memory 123 in the recording apparatus 3 (S112). Specifically, the video image recording processing unit 124 records the recording information recorded in the internal memory 123 in the recording apparatus 3 in the overwrite-prohibited mode.

Then the video image recording control apparatus 1 determines whether the driving has been ended (S113). During the driving, that is, when the vehicle is travelling, the process goes back to Step S114. On the other hand, when the driving has been ended, this processing is ended.

Other Embodiments

While the present disclosure has been described in view of the aforementioned embodiments, it is needless to say that the present disclosure is not limited to the configuration of the aforementioned embodiments and may include various modifications, corrections, and combinations that those skilled in the art would have made within the scope set forth in the claims according to the present application.

Further, arbitrary processing of the aforementioned video image recording control apparatus can be achieved by causing a CPU to execute a computer program. In this case, the computer program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Further, besides a case in which the functions of the aforementioned embodiments are achieved by a computer executing a program that achieves the functions of the aforementioned embodiments, a case in which the functions of the aforementioned embodiments are achieved by this program cooperating with an Operating System (OS) or an application software operating on the computer is also included in the embodiments of the present disclosure. Further, a case in which some or all of the processing of this program is performed by a function expansion board inserted into the computer or a function expansion unit connected to the computer and thus the functions of the aforementioned embodiments are achieved is also included in the embodiments of the present disclosure.

According to this embodiment, it is possible to provide a video image recording control apparatus, a video image recording control method, and a video image recording control program capable of performing important recording by appropriately controlling a recording mode when the end of a rewrite life of a recording apparatus has approached and maintaining the life of the recording apparatus.

The present disclosure is applicable to a driver recorder mounted on a moving body such as a vehicle and has an industrial applicability.

What is claimed is:

1. A video image recording control apparatus comprising:
   a recording processing unit configured to record video image data in a recording apparatus by a first recording mode in which video image data captured by an image pickup apparatus is recorded and a second recording mode in which video image data captured when an abnormality has been detected is recorded separately from the first recording mode; and
   a recording controller configured to restrict the first recording mode for the recording processing unit when the number of times of data rewriting for the recording apparatus has exceeded a first threshold which is smaller than a restriction value of the number of times of data rewriting of the recording apparatus.

2. The video image recording control apparatus according to claim 1, wherein
   the recording processing unit records video image data captured in accordance with a manual operation by a user in the recording apparatus by a third recording mode in which the video image data is recorded separately from the first recording mode, the second recording mode, or both of the first recording mode and the second recording mode, and
   the recording controller restricts the third recording mode when the number of times of data rewriting exceeds a second threshold, which is different from the first threshold.

3. The video image recording control apparatus according to claim 1, further comprising an alarm output unit configured to output alarm information to an external device when the number of times of data rewriting for the recording apparatus has exceeded the first threshold or the second threshold.

4. A video image recording control method in a video image recording control apparatus comprising:
   a recording processing unit configured to record video image data in a recording apparatus by a first recording mode in which video image data captured by an image pickup apparatus is recorded and a second recording mode in which video image data captured when an abnormality has been detected is recorded separately from the first recording mode; and
   a recording controller configured to perform control on the recording processing unit, the method comprising the steps of:
   determining whether the number of times of data rewriting for the recording apparatus has exceeded a first threshold; and
   restricting the first recording mode for the recording processing unit when it is determined that the number of times of data rewriting for the recording apparatus has exceeded the first threshold which is smaller than a restriction value of the number of times of data rewriting of the recording apparatus.

5. A non-transitory computer readable medium storing a video image recording control program for causing a computer comprising:
   a recording processing unit configured to record video image data in a recording apparatus by a first recording mode in which video image data captured by an image pickup apparatus is recorded and a second recording mode in which video image data captured when an abnormality has been detected is recorded separately from the first recording mode; and a recording controller configured to perform control on the recording processing unit, to execute the following steps of:

determining whether the number of times of data rewriting for the recording apparatus has exceeded a first threshold; and restricting the first recording mode for the recording processing unit when it is determined that the number of times of data rewriting for the recording apparatus has exceeded the first threshold which is smaller than a restriction value of the number of times of data rewriting of the recording apparatus.

* * * * *